Sept. 11, 1928.
R. W. SNYDER
AIR BAG STRIPPER
Filed May 28, 1925
1,683,736
4 Sheets-Sheet 1
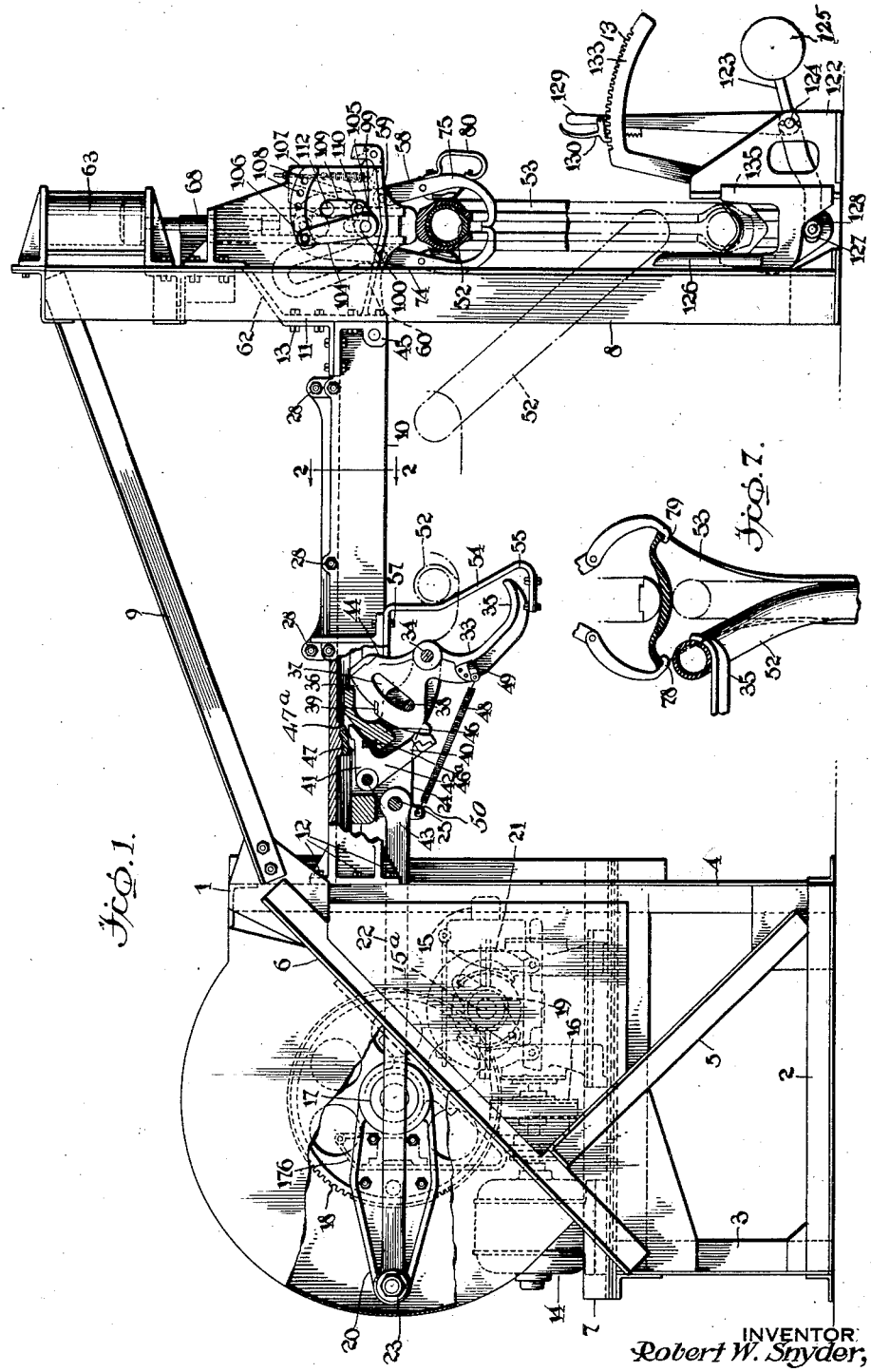
INVENTOR
Robert W. Snyder,
BY
A. D. Trogner Sept. 11, 1928.  R. W. SNYDER  1,683,736
AIR BAG STRIPPER
Filed May 28, 1925   4 Sheets-Sheet 2
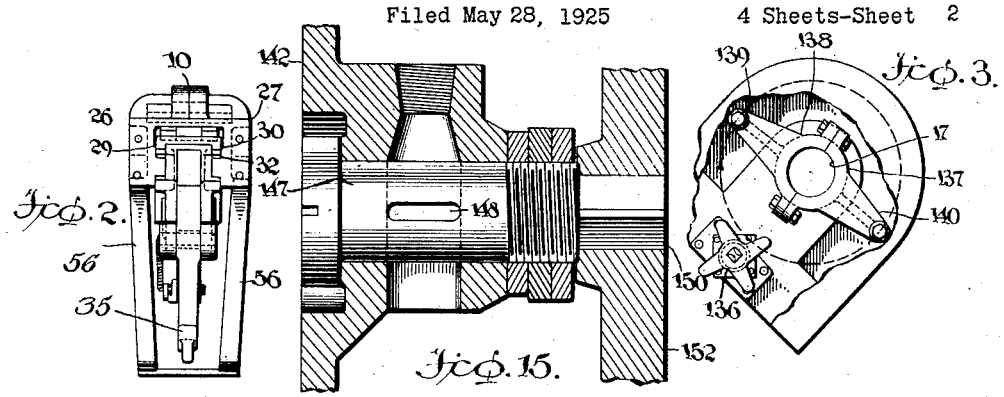
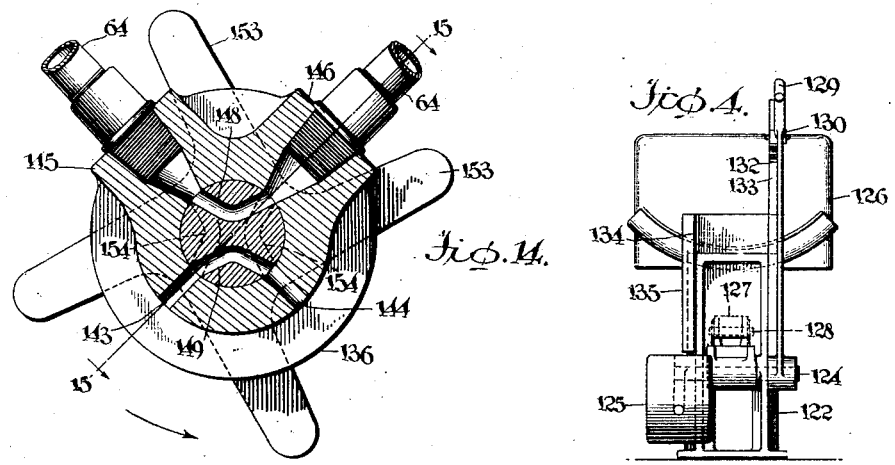
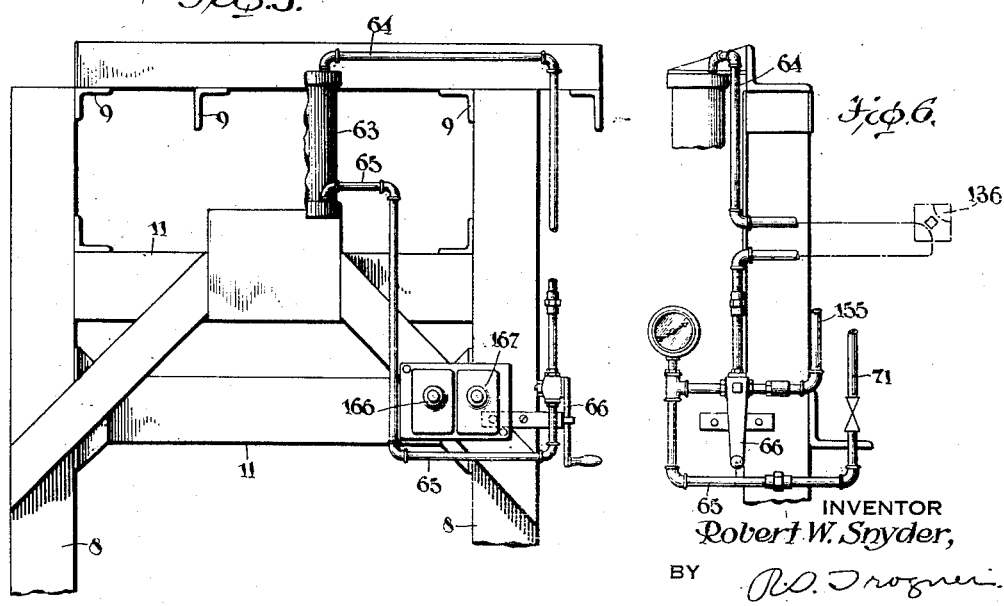
INVENTOR
Robert W. Snyder,
BY
ATTORNEY Sept. 11, 1928.  
R. W. SNYDER  
AIR BAG STRIPPER  
Filed May 28, 1925
1,683,736
4 Sheets-Sheet 3
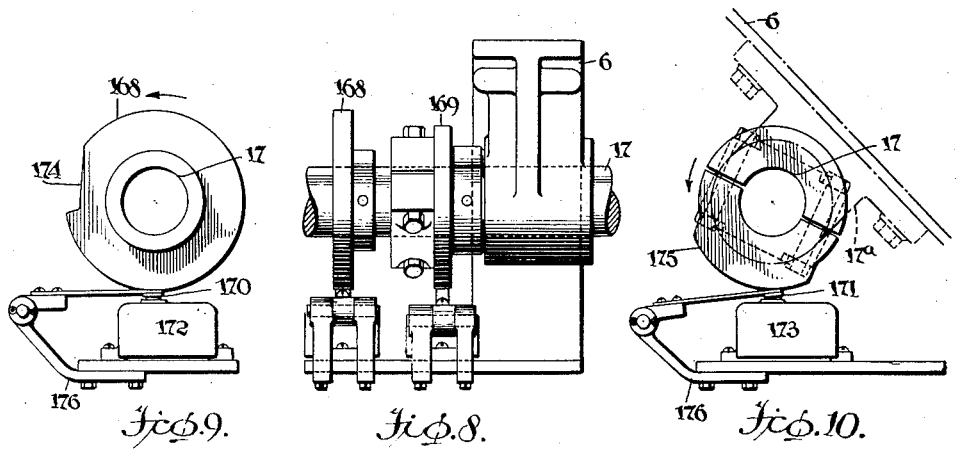
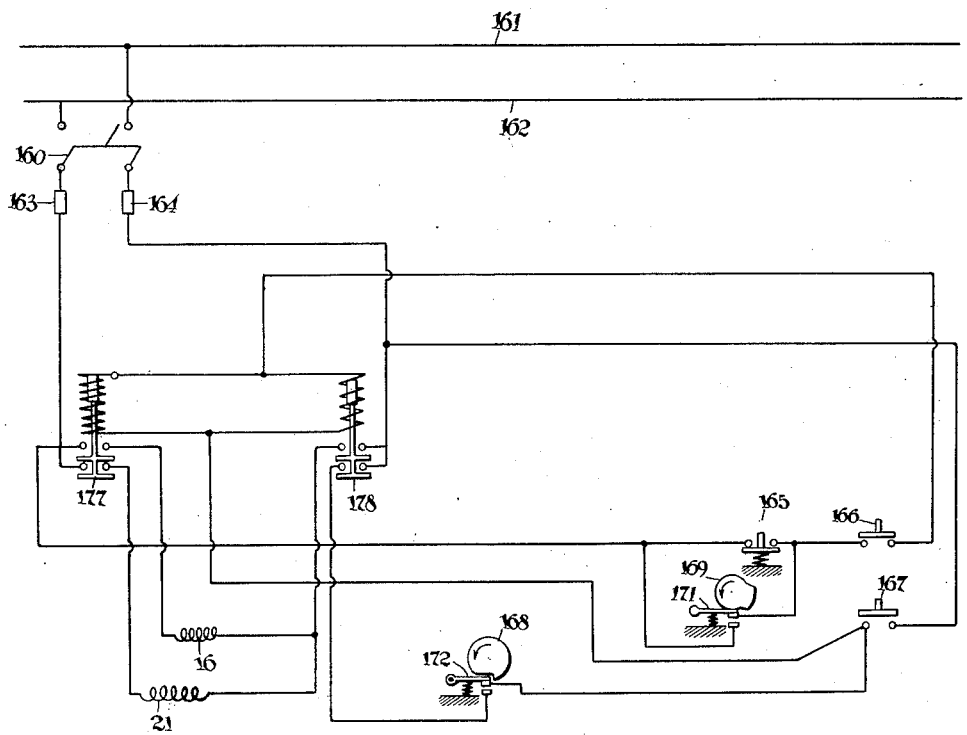
INVENTOR  
Robert W. Snyder,  
BY  
ATTORNEY

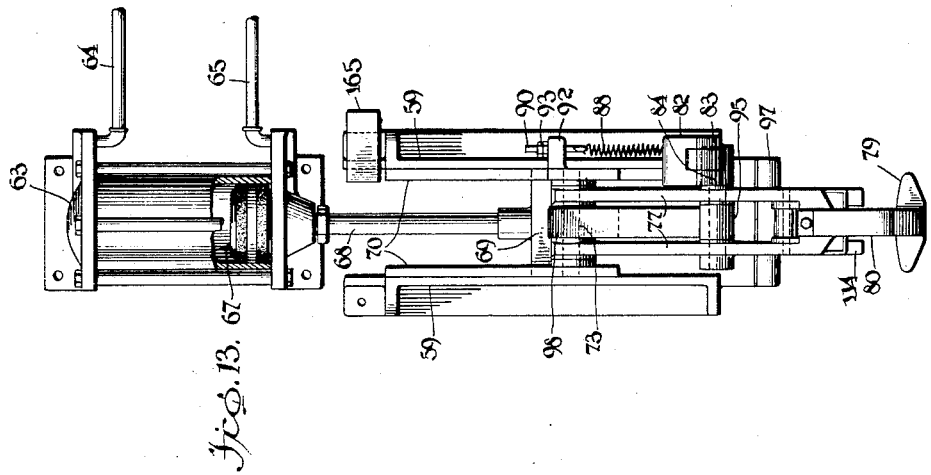
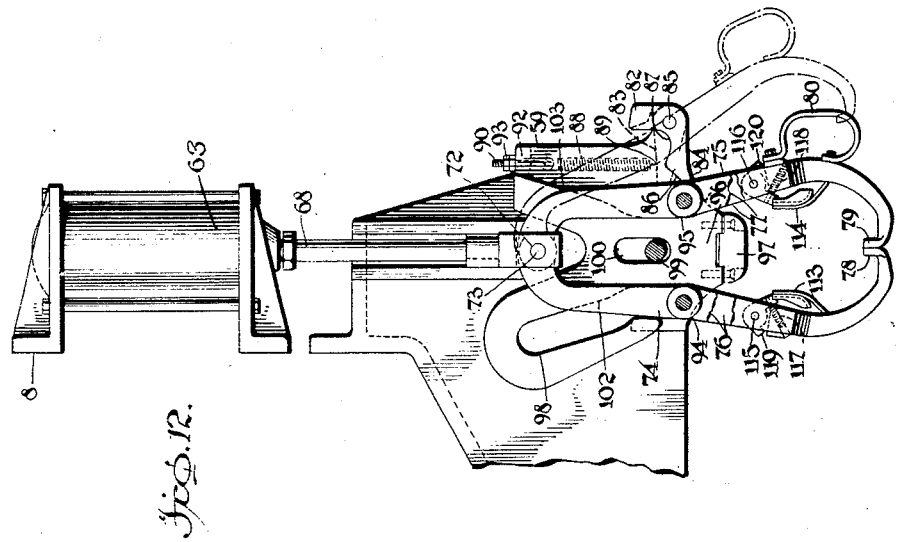

Patented Sept. 11, 1928.

1,683,736

UNITED STATES PATENT OFFICE.

ROBERT W. SNYDER, OF AKRON, OHIO, ASSIGNOR TO THE GOODYEAR TIRE & RUBBER COMPANY, OF AKRON, OHIO, A CORPORATION OF OHIO.

AIR-BAG STRIPPER.

Application filed May 28, 1925. Serial No. 33,454.

This invention relates to improvements in machines for removing flexible cores from vulcanized rubber articles and it has particular relation to a machine adapted to remove or strip inflatable airbags from the interior of pneumatic tire casings after the casings have been cured or molded.

One object of my invention is to provide a machine which will facilitate the removal of flexible pneumatic cores from manufactured rubberized articles with a minimum expenditure of time and labor.

Another object of my invention is to provide a power operated machine adapted to automatically remove from a completed pneumatic tire casing of any dimensions, the pneumatic core disposed therein during the curing operation.

In the manufacture of pneumatic tire casings, the casing is cured after having been completely built, by placing it within a mold and placing an inflatable core within the casing, which when inflated maintains the casing in close engagement with the mold during the vulcanizing process. After the casings have been cured the airbags are removed therefrom and again used in the vulcanization of other casings.

As pneumatice cores, of the character described, are difficult to remove from the casings, particularly in large size tires, it has been necessary to remove them from the casings manually with the aid of crowbars or other implements affording leverage. Consequently the operation of removing airbags was a very slow and tedious one, requiring an excessive expenditure of time and labor, subjecting the laborer employed in this work to severe physical strain and frequently injuring the airbags. A machine constructed in accordance with the principles of my invention obviates all of the disadvantages above mentioned, and will remove approximately ten times as many airbags from casings, with a given amount of labor, as was previously possible under the old system of removing them manually. In other words, with the aid of my machine two men may accomplish as much, within a given period of time, as twenty men were formerly able to accomplish.

For a detailed understanding of my invention, reference may now be had to the accompanying drawings forming a part of this specification, of which;

Fig. 1 is a view in side elevation of my machine, parts being broken away for the sake of clearness;

Fig. 2 is a cross-sectional view of a portion of the machine illustrated in Fig. 1, the section being along the line 2—2 of Fig. 1;

Fig. 3 is a detailed elevational view of a valve actuated mechanism employed upon the machine illustrated in Fig. 1;

Fig. 4 is a detail view in elevation of a tire supporting member constituting a portion of my machine;

Fig. 5 is a partially diagrammatic fragmentary elevational view illustrating the disposition of the air supply connections and electric switch boxes employed in operating my machine;

Fig. 6 is a partially diagrammatic side elevational view of the structure shown in Fig. 5;

Fig. 7 is a fragmentary cross-sectional view illustrating the manner in which an airbag is removed from a tire casing;

Fig. 8 is a detailed side elevational view of an electric switch mechanism employed in my invention;

Fig. 9 is a side elevational view of the switch mechanism shown in Fig. 8;

Fig. 10 is also a side elevational view of the switching mechanism shown in Fig. 8 but illustrating the side thereof opposite to that shown in Fig. 9;

Fig. 11 is a wiring diagram illustrating the electrical wiring connections employed in connection with my machine;

Fig. 12 is an enlarged detail view of a portion of the tire spreading mechanism employed in my machine and illustrated in Fig. 1;

Fig. 13 is a side elevational view of the mechanism illustrated in Fig. 12 but taken in a plane at right angles thereto;

Fig. 14 is a cross-sectional view of a valve mechanism employed in controlling the admission of compressed air to certain operative portions of the machine; and Fig. 15 is a cross-sectional view of the valve mechanism illustrated in Fig. 14, the section being taken along the lines 15—15 thereof.

Referring more particularly to the drawings my machine consists of an upright metal frame member 1 comprising a base member 2, upright supporting members 3 and 4 and angularly disposed bracing members 5 and 6.

These supporting and bracing members are secured to a platform 7 adapted for supporting a power driven mechanism employed in operating my machine. Additional upright frame members 8 of angular cross-section and spaced from the platform 7 are connected to the members 4 by means of angularly disposed reinforcing angle bars 9 and a horizontally disposed member 10 connected to a cross member 11 bolted to the upright members 8. The ends of the member 10 are secured to the members 4 and 11 by means of bolts 12 and 13 respectively.

An electric motor 14 mounted upon the platform 7 is provided with a gearing and worm mechanism 15 of a conventional type, which is actuated from the motor through the medium of a magnetic clutch 16. A brake member 21 is adapted to stop the gearing and worm shaft 15 when the clutch mechanism 16 is released.

The motor 14 is connected to and drives a crank shaft 17 carried above the platform 7 and journalled in bearings 17$^a$ rigidly secured to the frame members 6. A comparatively large gear wheel 18 is rigidly keyed upon the shaft 17 and intermeshes with a smaller driving gear wheel 19 keyed to a shaft 15$^a$ of the reducing gearing and worm mechanism 15.

A crank arm 20, rigidly secured to the shaft 17 is provided with a connecting rod 22, pivoted at one end to the crank arm in the usual manner as indicated at 23. The other end of the connecting rod is pivotally connected to a reciprocable member 24 by means of a pin 25. The member 24 is caused to slide upon the member 10 by means of the connecting rod 22 when the shaft 17 is rotated. The member 10 which serves as a guide rail for the member 24 is composed of two similar complementary sections 26 and 27, as best shown in Fig. 2, which are secured together by means of bolts 28.

In order to insure smooth action of the reciprocating member 24 in the guide member 10, the sections 26 and 27 are provided with spaced guideways or rails 29 and 30 lined with suitable bearing metal, for example, such as brass, indicated at 32.

A hook shape arm 33 is pivoted at a point intermediate its ends between the forked ends of the reciprocable member 24 by means of a pin 34 carried thereby, and is formed at one end with a hook shape end portion 35. The other end 36 of the arm 33 is enlarged and is provided with an arcuate slot 37 through which extends a pin 38, the latter being secured to the reciprocable member 24. Pivotal movement of the arm 33 is thus limited by the length of the slot 37. A shoulder 39 is formed on the end 36 of the arm and is adapted to be engaged by an arm 40 of a substantially L-shape member 42, which is pivoted upon the reciprocable member 24 by means of a pin 43. The member 42 is provided with a second arm 41 disposed at an angle to the arm 40.

When the member 24 slides in the guide member 10 in a forward direction, i. e., toward the members 8, a cam portion 44 of the arm 33 engages an abutment 45 at the extreme end of the guide member 10. This engagement causes the hook 35 to swing upwardly about the pivot pin 34 and the notched end 36 swings downwardly. The shoulder 39 thus travels beyond and snaps over the abutting end of the arm 40 of the L-shape member 42. A lug 46 is rigidly mounted upon the reciprocating member 24 and has mounted thereon a compression coil spring 46$^a$ which engages the arm 41 of the L-shape member 42 to resiliently hold the arm 40 in its uppermost position.

In order that the arm 40 of the member 42 may be released from the notch 39, a metal abutment or lug 47 formed with a cam surface 47$^a$ is secured to the interior surface of the guide member 10 adjacent the frame 1. When the reciprocable member 24 is moved in a rearward direction toward its limit of movement adjacent the frame 1, as indicated in Fig. 1, the arm 41 of the angular member 42 engages the surface 47$^a$ of the cam 47, causing the arm 42 to turn about the pivot 43, thereby throwing the arm 40 downwardly and releasing the shoulder 39 from engagement therewith.

A spring 48 is secured at one end to a bracket 49, secured to the arm 33, and at the other end to a lug 50 on the reciprocable member 24. As soon as the arm 40 of the member 42 releases the shoulder 39, the tension of the spring 48 draws the end 35 of the arm 33 downwardly about the pivot pin 34 to its original inoperative position.

After the reciprocable member 24 has been moved forward and the hook member 35 has been employed to remove an airbag 52 from a tire casing, the airbag remains hanging on the hook 35 during the greater part of the backward stroke of the reciprocable member. At approximately the same time that L-shape member 42 releases the arm 33 so that the hook 35 swings downwardly, the airbag carried on the member 35 engages a bracket 54, comprising two spaced guide bars 55 and 56, and is thereby caused to slide off the hook 35, and drops to the floor or to a conveyor, not shown. The bars 55 and 56 are secured to the guide rail 10 by means of bolts 57 and are spaced apart to permit the member 35 to move freely therebetween.

In order that a tire casing may be distorted to expose an airbag which has been inserted therein, I have provided a tire spreading mechanism 58 adapted to engage a suitably disposed tire casing illustrated at 53, and to spread apart the bead portions thereof at one point in its circumference. The mechanism 58 is mounted upon metal supporting members 59 which are bolted to a plate 60 carried by the member 11, and are reinforced by means of bracing members 62 secured to the members 8 and 11.

An air actuated cylinder 63 is secured to the upper end of the frame member 8 and may be supplied with air, or other suitable fluid, under pressure, at either its top or bottom, through air pipes 64 and 65, respectively, communicating with a pipe 71 supplying compressed air from any convenient source. A hand operated two-way valve mechanism 66, as best shown in Fig. 5, is carried on the frame members 8 and controls the flow of air into the cylinder 63. A piston 67 is operably disposed within the cylinder 63 and is connected to a piston rod 68 for operating the mechanism 58. As best shown in Figs. 12 and 13, a block 69 is rigidly secured to the lower end of the rod 68 and is adapted to slide between the two spaced vertically disposed supporting members 59 upon suitable guides 70 secured thereto. The block 69 is provided with an opening 72 within which is disposed a pin 73 which pivotally supports a pair of hook-shape arms 74 and 75, each of which is formed with integral forked members 76 and 77, respectively. Upturned hooks or fingers 78 and 79 are formed on the lower ends of the arms 74 and 75 and are adapted to engage a tire casing between the bead portions thereof. A handle 80 is secured to the arm 75 adjacent the lower end thereof, the latter being adapted to be manually swung to the position indicated in dot and dash lines of Fig. 12.

In order to maintain the arm 75 in the position indicated by the dot and dash lines of Fig. 12, I have provided a cam lever 82 formed with two integral arms 83 and 84 which are pivoted upon a pin 85 carried by the supports 59. The arm 84 is provided with a cam surface 86 which merges into an arcuate notch 87. A spring 88, under tension, is connected at one end to the arm 83, as indicated at 89, and at the other end to an adjustable bolt 90 secured to a lug 92 of the support 59. Adjustment of the spring to vary its tension is accomplished by adjusting the nut 93 upon the bolt 90. The arms 74 and 75, are provided with rollers 94 and 95, respectively, disposed between the forked members 76 of the arm 74 and 77 of the arm 75. When the arm 75 is swung outwardly, the roller 95 engages the cam surface 86, forcing the arm 84 downwardly against the tension of the spring 88, until the roller is engaged by the arcuate notched portion 87. The arm 75 is thus maintained in the position shown in dotted lines of Fig. 12, until the handle is pressed inwardly to release the roller 95 from the notch 87.

A rigid member 96 connects the lower portion of the supporting members 59 and is formed with an abutment 97, the latter being disposed between the arms 74 and 75. A cam member 98 is supported between the members 59 and pivoted upon a pin 99, the latter being secured to the member 59 and disposed within slots 100 formed in the members 59. The cam member 98 is provided with two upwardly divergent cam surfaces 102 and 103 which extend between the forked members of the arms 74 and 75, respectively, as more clearly indicated in Fig. 12. In order that the arms 74 and 75 may be spread apart, the roller members 94 and 95 secured to the arms 74 and 75 travel upon the cam surfaces 102 and 103 when the piston rod 68 is moved upwardly, the arms 74 and 75 pivoting upon the pin 73.

Tire casings of various cross-section may be received by the spreading mechanism 58 by adjusting the cam member 98. To effect this adjustment a lever arm 104, as best shown in Fig. 1, is formed with an integral lug 105 secured at one end to the pin 99 carrying the cam member 98, and at the other end is provided with a slidable spring pressed pin 106. An arcuate plate 107 is rigidly secured to one of the members 59 and is provided with a plurality of arcuately arranged spaced openings 108 into any of which the pin 106 is adapted to be positioned. The lever 104 with its integral lug 105 is supported upon the lower end of a link 109 by being pivoted to the lug at 110. The link 109 is pivotally mounted upon the member 59 by means of a pintle 112. When the lever 104 is moved about the pivot 110 in a clockwise direction the pin 99, guided in the slot 100 carries the cam member 98 upwardly, and the cam member is secured in adjusted position by inserting the pin 106 in one of the openings 108. By virtue of this adjustment the arms 74 and 75 move to a greater or lesser degree, according to the position of the pin 106, before the hooks 78 and 79 begin to separate.

The arms 74 and 75 are provided with members 113 and 114 which are pivotally mounted between forked portions of the arms 74 and 75, respectively, upon pins 115 and 116. Compression springs 117 and 118 carried by the arms 74 and 75, respectively, engage the members 113 and 114 and tend to move them inwardly until their pivotal movement is arrested by engagement with the lugs or stop members 119 and 120. These members 113 and 114 serve the purpose of centrally positioning a tire casing between the arms 74 and 75.

A tire support 122 is positioned adjacent the lower part of the frame members 8 and is provided with a lever 123 pivoted intermediate its ends at 124 to the support 122. One end of the lever 123 supports a weight 125 and the other end supports a trough-like member 126. A slot 127 is provided in the member 126 and is adapted to receive a pin 128 secured to the end of the lever 123. A handle 129 rigidly secured to the pivot pin 124, is adapted to raise and lower the member 126 to any desired position by adjusting a suitable latch 130 in adjusting notches 132, formed on an arcuate bar 133. The trough member 126 slides vertically in a tongue and groove guideway indicated at 134 and 135. If it is desired, a conveyor track, not shown, may be provided adjacent the supporting member 122 so that tires having airbags therein may be rolled by machinery along the track into the support 122.

Referring to Figs. 5 and 6, the airpipe 64 communicating with the upper end of the cylinder 63 is also in communication with a valve mechanism indicated at 136. The valve mechanism 136 is supported upon the frame members 6 adjacent the crank shaft 17 as illustrated in Fig. 3. Two complementary clamping members 137 and 138 having oppositely extending arms 139 and 140, are rigidly mounted upon the drive shaft 17 and are adapted to rotate therewith to actuate the valve mechanism.

Referring to Figs. 3, 14 and 15, the valve mechanism 136 comprises a stationary hollow base member 142 provided with radially extending openings 143 and 144, and threaded airpipe connections 145 and 146 for attaching the communicating sections of the pipe 64. A rotatable valve core 147, provided with valve ducts or openings 148 and 149, fits tightly within the opening in the base member 142 and is adapted to be rotated therein. One end of the core is formed into a squared head 150. A valve actuating member 152 is secured upon the head 150, and is formed with four symmetrically spaced substantially radially extending fingers 153, the latter being adapted to be engaged by the ends of the arms 139 and 140 when the shaft 17 is rotated. It will be noted that the member 152, and consequently the core 147, is rotated 90 degrees each time an arm 139 or 140 engages and actuates a finger 153. Likewise, each time the shaft 17 is rotated 180 degrees, the one or the other of the arms 139 or 140 engages a finger 153.

When the valve ducts or openings 148 and 149, which are disposed within the core 147, are in the position as shown in the full lines of Fig. 14, air flows freely through the pipe 64 interconnecting the valve 66 and the top of the cylinder 63. In this position of the valve, the reciprocating member 24 is at rest half-way between the limits of its stroke and the valve remains in this position as long as the reciprocating member is at least half-way between the limits of its stroke or at any point on the rear side of its half-way position. When the reciprocable member 24 travels beyond the middle position of its stroke toward the forward limit thereof, as soon as it passes the middle position of the stroke, one of the arms 139 or 140 will engage one of the fingers 153 and rotate the core 147 so as to move the ducts 148 and 149 of the valve mechanism to the position as indicated in dot and dash lines 154 in Fig. 14. In the last mentioned position the ducts 148 and 149 communicate with the ducts 143 and 144 which in turn communicate with the atmosphere. In this position it will be seen that any air in the cylinder above the piston will be allowed to escape through the opening 143. Likewise, if the valve 66 is opened to communicate with the pipe 71, when the ducts 148 and 149 are in the position indicated in dot and dash lines of Fig. 14, air will not be admitted to the top of the cylinder but will escape through the opening 144. From the above description it will be apparent that the arms 74 and 75 can not be actuated downwardly after the reciprocable means has passed the middle position of its stroke, traveling in a forward direction. This construction is for the purpose of preventing the arms 74 and 75 from being moved downwardly against the hook member 35 when the latter engages the airbag 52. An exhaust pipe 155 is conveniently located and connected to the valves 66 and 136.

The operation of the reciprocable member 24 by the crank shaft 17 is automatically controlled by a system of electrical wiring and switches diagrammatically illustrated in Fig. 11. One control switch is manipulated to start the reciprocating member and the remainder of the operation including one complete revolution of the shaft 17 is performed automatically. At the completion of one revolution, the shaft is stopped automatically. The electrical wiring which provides this automatic operation includes a knife switch 160 connected to main power lines 161 and 162. Fuses 163 and 164 of the usual type are connected to the switch 160. In order to prevent the reciprocable member 24 from striking the arms 74 and 75 a safety switch 165 is provided adjacent the piston rod 68 and is closed when the block 69, carrying the arms 74 and 75, is in contact therewith in raised position. I have also provided an emergency switch or push button 166 adapted to be manually operated to stop rotation of the shaft 17 at any time. A starting push button 167 is conveniently located where an operator may have ready access thereto.

As best shown in Figs. 8, 9 and 10, two cam members 168 and 169 are keyed to the shaft 17 adjacent each other and are adapted to operate push buttons 170 and 171, disposed within switch boxes 172 and 173, respectively, when the shaft 17 is rotated. It is desired that the circuit controlled by the push button 170 be closed during substantially the complete revolution of the shaft 17 and the cam member 168. A notch as indicated at 174 is provided upon the cam member 168 for the purpose of breaking the electric circuit, when the button registers therewith at the completion of the revolution. In like manner the cam member 169 is provided with a raised portion 175, covering substantially one fourth of its circumference, which maintains the switch button 171 closed during approximately one fourth of the revolution of the shaft 17.

The shaft 17, and hence the cam members 168 and 169, rotate in a direction indicated by the arrows in Figs. 9 and 10. A bracket 176 secured to the frame members 6, serves to support the push buttons 170 and 171 and switch boxes 172 and 173 in suitable positions to be engaged by the cam members 168 and 169.

When the switch or push button 167 is manipulated with the block 69 in raised position holding closed the switch 165, the magnet winding of the clutch 16 is energized releasing the brake 21 and operatively connecting the motor 16 to the shaft 17 to rotate the latter in the direction indicated by the arrows in Figs. 1 and 9. As soon as the button 167 is operated and the circuit closed, the magnetic switches 177 and 178 are energized to close the circuits of the magnets 16 and 21 and the shaft 17 begins to rotate together with the cams 168 and 169. When the push button 168 leaves the notch 174 the operator may release the button 167, the circuit being maintained closed by the closure of the button or switch 170, and the shaft will continue to rotate. After the cam member 168 has been rotated substantially three fourths of a revolution and the reciprocable member 24 is near the rear limit of its stroke, the raised portion 175 of the cam member 169 closes the switch or push button 171 which remains closed the remaining one fourth of a revolution. It will be seen that the cam member 169 is adapted to take the place of the switch 165 during the last one fourth of the revolution of the shaft, and therefore the piston block 69 and the arms 74 and 75 may be safely operated downwardly while the switch 169 is closed, without breaking the circuit first closed by the switch 165. Both cams release the switches simultaneously, thus breaking the electric circuit, releasing the magnetic clutch 16 and closing the brake member 21 to prevent undue rotation of the shaft 17 caused by momentum of the rotating parts.

The operation of my machine is as follows:

In idle position the crank arm 20 stands a little less than half-way forward from the rear limit of its stroke, and the reciprocable member 24 is at rest approximately midway the guide member 10. The tire support 122 and cam member 98 are adjusted, as described, to accommodate the size of tire casings that are to have airbags removed therefrom.

A tire 53 is rolled into the trough member 126 as the handle 80 is grasped by the operator and swung outwardly to snap the roller 95 into the notch 87. The tire is then placed into the position shown in Fig. 1 and the arm released from the notch 87 and pressed back into position as shown so that the fingers 78 and 79 are disposed in engagement with each other between the bead portions of the tire casing.

The valve 136, in the idle position of the machine is in open communication with the pipe 64 as indicated in Fig. 14. Air is admitted through the lower pipe connection 65 of the cylinder 63 by turning the two-way valve mechanism 66 in one direction, thereby raising the piston rod 68 and the connected arms 74 and 75. The bead portions of the tire are thus spread apart, the tread portion of the tire being pressed against the abutment 97 as the rollers 94 and 95 travel upwardly and divergently against the surfaces 102 and 103 of the cam member 98. This operation exposes the airbag 52 in the manner indicated in dot and dash lines of Fig. 7.

The operator then presses the electric push button 167 to start rotation of the shaft 17 and to move the reciprocable member 24 forward. As soon as the reciprocable member passes the mid-portion of the guide member 10 or the half-way position of the forward stroke of the reciprocable member, the ducts of the valve 136 assume the position shown in dot and dash lines of Fig. 14. As previously described, this position of the valve 136 prevents air from being admitted to the top of the cylinder through the pipe 64 after the reciprocable member 24 has moved forward past the middle position of its stroke. At substantially the forward limit of the stroke, the cam portion 44 engages the lug 45 throwing the hook end 35 of the arm 33 upwardly into engagement with the opposite side of the air bag 52 and the end 40 of the angular member 42 snaps into the notch 39 to hold the hook 35 in the position indicated in Fig. 7.

The shaft 17 continues to rotate and the hook end 35 of the arm pulls the air bag from the tire casing as the member 24 travels rearwardly. When the member 24 passes the mid-portion of the guide member 10 toward the rear limit of its stroke, the ducts 148 and 149 of the valve 136 assume the position indicated in full lines of Fig. 14 and air can then be admitted through the pipe 64 to the top of the cylinder 63 by manually operating the two-way valve mechanism 66 in the direction opposite to that above described in admitting air to the cylinder through the pipe 64, thereby lowering the arms 74 and 75 and releasing from spread position the tire casing 53 which can be removed from the support 122. During the last one-fourth of a revolution of the crank arm 20, the switch 171 is closed so that the piston block 69 may be released from the switch 165 without breaking the electric circuit until both cam members 168 and 169 release the switches 170 and 171 simultaneously.

When the reciprocable member approaches the limit of rearward movement the cam surface 47 engages the L-shape member 42 to release the arm 40 from the notch 39, thereby allowing the air bag to slide off the end of the hook 35 against the bracket 54 and drop to the floor. Another tire can then be placed upon the support 122 and the operation repeated.

Although I have illustrated but one form which my invention may assume, and have described in detail but a single application thereof, it will be apparent to those skilled in the art that it is not so limited but that various minor modifications and changes may be made therein without departing from the spirit of my invention or from the scope of the appended claims.

What I claim is:

1. A machine operable in cycles comprising supporting means for a tire casing having a flexible core therein and a mechanism actuated by the machine during each cycle of operation to engage and to remove bodily the core from the tire casing.

2. A machine comprising a means adapted to support a tire casing having an air bag therein, means for spreading a portion of the casing away from the airbag, and inherently rigid means for removing an airbag from within the casing.

3. A machine comprising a member adapted to support a tire casing having an airbag therein, means for spreading open a portion of the casing, and a movable hook-shape member adapted to engage and remove the airbag from the casing.

4. A machine comprising a member adapted to support a tire casing, means for spreading open a portion of the casing, and a reciprocable member adapted to engage and remove an airbag from the casing.

5. A machine adapted to remove an airbag from a tire casing comprising means for spreading open the tire casing, means operated in a plane at right angle to the plane of the tire casing for removing the airbag from a tire casing.

6. A machine adapted to remove an airbag from a tire casing comprising a support for the casing, slidable mechanism provided with means for spreading open a portion of the casing, and a reciprocating arm provided with means adapted to engage the airbag to draw the latter from the casing.

7. An airbag stripping machine comprising a member adapted to receive a tire casing, means for distorting a portion of the casing to expose the airbag, and means adapted to move into engagement with and remove the airbag from the casing.

8. A machine comprising a supporting member for a rubberized article the latter having an inflatable core therein, and means for mechanically engaging and removing the core from the rubberized article.

9. A machine comprising means for supporting a tire casing the latter having an inflatable core therein, pneumatically operated means for spreading open a portion of the casing, and means driven to move into engagement with the core for removing the latter from the casing.

10. A machine comprising means for supporting a tire casing the latter having an inflatable core therein, vertically movable means for spreading open the tire casing at the bead portions thereof, and a hook member adapted to remove the inflatable core from the casing.

11. A machine comprising means for supporting a tire casing the latter having an inflatable core disposed therein, a vertically movable member adapted to engage the casing to expose the enclosed core, and a reciprocable hook member adapted to remove the core from the casing.

12. A machine comprising means for supporting a tire casing, the latter having an inflatable core disposed therein, a movable member provided with fingers adapted to engage the casing adjacent the bead portions thereof to expose the core, and a reciprocable hook-shape member adapted to remove the core from the casing.

13. A machine comprising supporting means for an annular hollow rubberized article the latter having an inflatable core disposed therein, an abutment adapted to engage the periphery of the article, means for spreading open a portion of the article against the abutment to expose the inflatable core, and means for removing the core from the article.

14. A machine comprising supporting means for a hollow annular member the latter having an inflatable core disposed therein, an abutment adapted to engage a portion of the periphery of the annular member, pivoted members provided with fingers adapted to move into engagement with the annular member to spread open a portion of the latter against the abutment and expose the core therein.

15. A machine comprising supporting means for a hollow annular member having a flexible core disposed therein, an abutment adapted to engage a portion of the periphery of the annular member, two arms pivoted together and to an actuating means adapted to engage the annular member to spread open a portion of the latter against the abutment, and means for removing the core therefrom.

16. A machine comprising supporting means for a tire casing, the latter having a flexible core disposed therein, an abutment adapted to engage a portion of the casing, pivoted members provided with fingers adapted to engage the bead portion of the casing at one point, cam members cooperating with the pivoted members to spread open the casing, and means for removing the core from the latter.

17. A machine comprising supporting means for a tire casing, the latter having a flexible core disposed therein, an abutment adapted to engage a portion of the periphery of the casing, means for spreading a portion of the casing against the abutment including a pneumatically operated piston having spreading fingers attached thereto, and means for removing the core from the casing.

18. A machine comprising supporting means for a tire casing, the latter having a flexible core therein, an abutment adapted to engage a portion of the periphery of the casing, pneumatically operated means including a piston rod having two arms pivoted thereto for spreading open a portion of the casing against the abutment, a cam surface adjacent the abutment adapted to spread the arms when the piston rod is moved in one direction, and means for removing the core from the casing.

19. A machine comprising supporting means for a tire casing, the latter having a flexible core disposed therein, an abutment adapted to engage a portion of the periphery of the casing, pneumatically operated means including a piston rod, two arms formed with curved portions one end of each arm being pivoted to the piston rod, rollers attached to said arms, a member provided with cam surfaces engaging the rollers to spread apart the curved arms, and means for engaging the core to remove it from the casing while the curved arms are spread apart.

20. A machine comprising supporting means for a tire casing, the latter having a flexible core disposed therein, an abutment adapted to engage a portion of the periphery of the casing, pneumatically operated means including a piston rod, arms formed with curved portions one end of each arm being pivoted to the piston rod, rollers attached to said arms, a member provided with cam surfaces adjustable in the direction of movement of the piston rod, the rollers being adapted to travel on the cam surfaces to cause the arms to spread apart portions of the casing, and means for removing a core from the casing.

21. A machine comprising supporting means for a tire casing, the latter having a flexible core disposed therein, an abutment adapted to engage a portion of the periphery of the casing, a member formed with divergent cam surfaces mounted adjacent the abutment, an arm provided with cooperating linkage keyed to a pin extending through said member, the arm being adapted to adjust the member at predetermined positions, means for spreading a portion of the casing, and means for removing the core from the casing.

22. A machine comprising supporting means for a tire casing, the latter having a flexible core disposed therein, an abutment adapted to engage a portion of the periphery of the casing, means for spreading the casing against said abutment including two curved arms adapted to encompass the casing before spreading it, yieldable means secured to the arms for positioning the casing therebetween, and means for removing the core from the casing.

23. A machine comprising supporting means for a tire casing, the latter having a flexible core disposed therein, the supporting means including a pivoted lever having a member of trough shape secured at one end thereof, means for adjusting the lever and trough member to predetermined positions, means for spreading a portion of the tire casing, and means for removing the core from the casing.

24. A machine comprising supporting means for a tire casing, the latter having a flexible core disposed therein, said supporting means including a pivoted lever having a trough-shape member mounted upon one end thereof, a handle rigidly secured to the lever adapted to adjust the latter about its pivotal point and to maintain the trough member at predetermined positions, means for spreading a portion of the casing, and means for removing the core from the casing.

25. A machine comprising supporting means for a tire casing, the latter having a flexible core disposed therein, a frame element provided with means for gripping and spreading open a portion of the casing, a guide member adjacent said frame element and means movable in the guide member for removing the core from the casing.

26. A machine comprising supporting means for a tire casing, the latter having a flexible core disposed therein, a frame element provided with means for gripping and spreading a portion of the casing, a guide member adjacent said frame element and mechanism including a hook member slidable in the guide member for removing the core from the casing.

27. A machine comprising supporting means for a tire casing, the latter having a flexible core disposed therein, a frame element provided with means for gripping and spreading a portion of the casing, a guide member adjacent said frame element, a mechanism including a hook member adapted to be reciprocated in the guide member for removing the core from the casing, and means for disengaging the core from the hook member.

28. A machine comprising supporting means for a tire casing, the latter having a flexible core disposed therein, a frame element provided with means for gripping and spreading a portion of the casing, a guide member secured to the frame element, a reciprocating member slidable in said guide member, an arm formed with a hook pivoted to the reciprocating member and adapted to be swung about the pivot into engagement with the core for removing the latter from the casing.

29. A machine comprising a support for a tire casing, the latter having a flexible core disposed therein, a frame element provided with means for gripping and spreading apart the beads of the casing at one point, a guide member secured to the frame element, a reciprocating member slidable in said guide member, an arm formed with a hook pivoted to the reciprocating member, a lug on the guide member adapted to engage a portion of the arm to throw the hook member into engagement with the core at the point the beads of the casing are spread apart.

30. A machine comprising a support for a tire casing, the latter having a flexible core disposed therein, a frame element provided with means for gripping and spreading a portion of the casing, a guide member secured to the frame element, reciprocating means including an arm formed with a hook slidable in said guide, means on the guide member adapted to engage the hook at substantially the end of the reciprocating stroke for throwing the hook into engagement with the core, and means for temporarily securing the hook in the position of engagement with the core to remove the latter from the casing.

31. A machine comprising a support for a tire casing, the latter having a flexible core disposed therein, a frame element provided with means for gripping and spreading a portion of the casing, a guide member secured to the frame element, reciprocating means including an arm slidable in said guide member, a lug on the guide member adapted to cooperate with the arm to raise one end thereof into engagement with the core when the reciprocating means approaches the limit of forward movement, means for automatically securing the arm in raised position and means for automatically releasing the arm from raised position when the reciprocating means approaches the limit of rearward movement.

32. A machine comprising a support for a tire casing, the latter having a flexible core disposed therein, a frame element provided with means for gripping and spreading open a portion of the casing, a guide member secured to the frame element, reciprocating means including an arm slidable in said guide member, a lug on the guide member adapted to cooperate with the arm to raise one end thereof into engagement with the core when the reciprocating means approaches the limit of movement in one direction, means for automatically securing the arm in raised position, a cam member on the guide member cooperating with the arm to release the latter from raised position when the reciprocating means approaches the limit of movement in the other direction, and means for removing the core from the hook member during the travel of the reciprocating member toward the cam member.

33. A machine comprising a support for a tire casing, the latter having a flexible core disposed therein, a frame element provided with means for gripping and spreading a portion of the casing, a guide member secured to the frame element, reciprocating means including an arm slidable in said guide member, a lug on the guide member adapted to cooperate with the arm to raise one end thereof into engagement with the core when the reciprocating means approaches the limit of movement in one direction, means for automatically securing the arm in a raised position, a cam member on the guide member cooperating with the arm to release the latter from raised position when the reciprocating means approaches the limit of movement in the other direction and a bracket on the guide member adjacent the back of the reciprocating means for removing the core from the hook member during the travel of the reciprocating means toward the cam member.

34. A machine comprising supporting means for a tire casing, the latter having a flexible core disposed therein, a frame element provided with means for gripping and spreading open the casing, a guide member provided with reciprocating means adapted to remove the core from the casing, a crank shaft operatively connected to the reciprocating means, and electrically operated means for driving the crank shaft.

35. A machine comprising supporting means for a tire casing, the latter having a flexible core disposed therein, a frame element provided with means for gripping and spreading the casing, a guide member provided with reciprocating means adapted to remove the core from the casing, a crank shaft operatively connected to the reciprocating means including switches adapted to be automatically controlled to cause the crank shaft to make one complete revolution and then to break the electric contact.

36. A machine comprising a supporting means for a tire casing, the latter having a flexible core disposed therein, pneumatically operated means for spreading open the casing to expose the core, a guide member provided with reciprocating means adapted to remove the core from the casing, an electrically driven crank shaft operatively connected to the reciprocating means, a valve disposed adjacent the crank shaft and communicating with the pneumatically operated means to control the movement thereof, and means mounted on the crank shaft for operating the valve at intervals as the latter rotates.

37. A machine comprising supporting means for a tire casing, the latter having a flexible core disposed therein, pneumatically operated means adapted to be alternately moved upwardly and downwardly for spreading open the casing to expose the core, reciprocating means adapted to engage and remove the core from the casing, a power driven crank-shaft operatively connected to the reciprocating means, and a valve operated by the crank shaft and communicating with the pneumatically operated means, the valve, pneumatically operated means and reciprocating means being so associated that the pneumatically operated means is prevented from being operated downwardly when the reciprocating means is in the position of engagement with the core.

38. A machine comprising means for supporting a tire casing the latter having a flexible core disposed therein, pneumatically operated means for spreading apart portions of the casing to expose the core, means for removing the core from the casing, and valve mechanism communicating with the pneumatically operated means and operatively associated with the means for removing the core to control movement of the pneumatically operated means.

39. A machine comprising means for supporting a tire casing, the latter having a flexible core disposed therein, mechanism operated by compressed air for spreading apart portions of the tire casing, reciprocating means adapted to remove the core from the casing, a valve communicating with said mechanism and operatively associated with the reciprocating means to control the movement of the mechanism, and electrical means for automatically controlling movement of the reciprocating means.

40. In a machine for pulling bags out of tire casings, a device for opening the tire, and a single means for initially separating the tire and bag at the point of opening and thereafter pulling the bag free of the tire.

In witness whereof, I have hereunto signed my name.

ROBERT W. SNYDER.